(12) United States Patent
Poeppelmann

(10) Patent No.: US 11,139,971 B2
(45) Date of Patent: Oct. 5, 2021

(54) CONDUCTING A CRYPTOGRAPHIC OPERATION

(71) Applicant: Infineon Technologies AG, Neubiberg (DE)

(72) Inventor: Thomas Poeppelmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 489 days.

(21) Appl. No.: 16/040,743

(22) Filed: Jul. 20, 2018

(65) Prior Publication Data

US 2019/0044719 A1    Feb. 7, 2019

(30) Foreign Application Priority Data

Aug. 7, 2017  (DE) .......................... 102017117899.6

(51) Int. Cl.
| | | |
|---|---|---|
| *H04L 9/30* | (2006.01) | |
| *H04L 9/00* | (2006.01) | |
| *H04L 9/06* | (2006.01) | |

(52) U.S. Cl.
CPC .......... *H04L 9/3093* (2013.01); *H04L 9/004* (2013.01); *H04L 9/0643* (2013.01); *H04L 9/3026* (2013.01)

(58) Field of Classification Search
CPC ..... H04L 9/3093; H04L 9/004; H04L 9/0643; H04L 9/3026; G06F 7/588; G06F 21/602
See application file for complete search history.

(56) References Cited

U.S. PATENT DOCUMENTS

| | | | | |
|---|---|---|---|---|
| 8,364,740 | B2 * | 1/2013 | Fischer | G06F 7/722 |
| | | | | 708/620 |
| 9,083,526 | B2 * | 7/2015 | Gentry | H04L 9/3093 |
| 9,602,278 | B2 * | 3/2017 | Furukawa | H04L 9/008 |
| 9,673,977 | B1 * | 6/2017 | Kalach | H04L 9/0869 |
| 9,698,986 | B1 * | 7/2017 | Gutoski | H04L 9/0838 |
| 9,942,039 | B1 * | 4/2018 | Gutoski | G06F 7/72 |
| 10,097,351 | B1 * | 10/2018 | Kelly | H04L 9/0662 |
| 2007/0100926 | A1 * | 5/2007 | Fischer | G06F 7/722 |
| | | | | 708/620 |
| 2008/0301459 | A1 * | 12/2008 | Ebeid | H04L 9/0841 |
| | | | | 713/180 |
| 2010/0232599 | A1 * | 9/2010 | Joye | G06F 7/725 |
| | | | | 380/28 |
| 2012/0039463 | A1 * | 2/2012 | Gentry | H04L 9/3026 |
| | | | | 380/28 |
| 2012/0317412 | A1 * | 12/2012 | Zaverucha | H04L 9/3252 |
| | | | | 713/156 |

(Continued)

OTHER PUBLICATIONS

German Patent Office, Office Action issued for DE 102017117899.6, 10 pgs., dated Apr. 23, 2016.

(Continued)

*Primary Examiner* — Matthew Smithers
*Assistant Examiner* — Mirza Israr Javed
(74) *Attorney, Agent, or Firm* — Schiff Hardin LLP

(57) ABSTRACT

A method for checking results, including (a) determining a first result by conducting an operation g( ) based on test data; (b) determining combined data by performing a combining operation based on the test data and user data; (c) determining a second result conducting the operation g( ) based on the combined data; and (d) determining whether the second result is indicative of the first result.

17 Claims, 2 Drawing Sheets

(56) References Cited

U.S. PATENT DOCUMENTS

| | | | | |
|---|---|---|---|---|
| 2013/0173985 A1* | 7/2013 | Chung | ............... | G06F 11/1012 |
| | | | | 714/755 |
| 2013/0208886 A1* | 8/2013 | Lee | ....................... | H04L 9/004 |
| | | | | 380/28 |
| 2013/0318360 A1* | 11/2013 | Yamamoto | ............... | H04L 9/14 |
| | | | | 713/189 |
| 2014/0233726 A1* | 8/2014 | Yajima | .................... | H04L 9/008 |
| | | | | 380/28 |
| 2016/0261409 A1* | 9/2016 | French | ...................... | H04L 9/00 |
| 2016/0352510 A1* | 12/2016 | Morikawa | ............... | H04L 9/008 |
| 2017/0132279 A1* | 5/2017 | Teranishi | ............ | G06F 16/2453 |
| 2018/0060040 A1* | 3/2018 | Diop | ....................... | G06F 7/722 |
| 2018/0083786 A1* | 3/2018 | Dierks | ............... | G06Q 20/3678 |
| 2018/0109376 A1* | 4/2018 | Gentry | ...................... | H04L 9/30 |
| 2018/0183570 A1* | 6/2018 | Zheng | ...................... | H04L 9/008 |
| 2018/0309574 A1* | 10/2018 | Lyubashevsky | ...... | H04L 9/3093 |
| 2019/0044719 A1* | 2/2019 | Poeppelmann | ....... | H04L 9/0643 |
| 2019/0044720 A1* | 2/2019 | Poeppelmann | ......... | H04L 9/002 |

OTHER PUBLICATIONS

T. Gueneysu, et al., "Lattice-Based Signatures: Optimization and Implementation on Reconfigurable Hardware," IEEE Transactions on Computers, vol. 64, No. 7, 14 pgs., Jul. 2015.

Wikipedia, "Chinese Remainder Theorem," https://en.wikipedia.org/w/index.php?title=Chinese_remainder_theorem&oldid=793857969, 12 pgs., Apr. 23, 2018.

* cited by examiner

CONDUCTING A CRYPTOGRAPHIC OPERATION

BACKGROUND

Embodiments of the present disclosure relate to an approach to efficiently conducing a cryptographic operation, in particular to improve the robustness of such operations against fault injection attacks.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
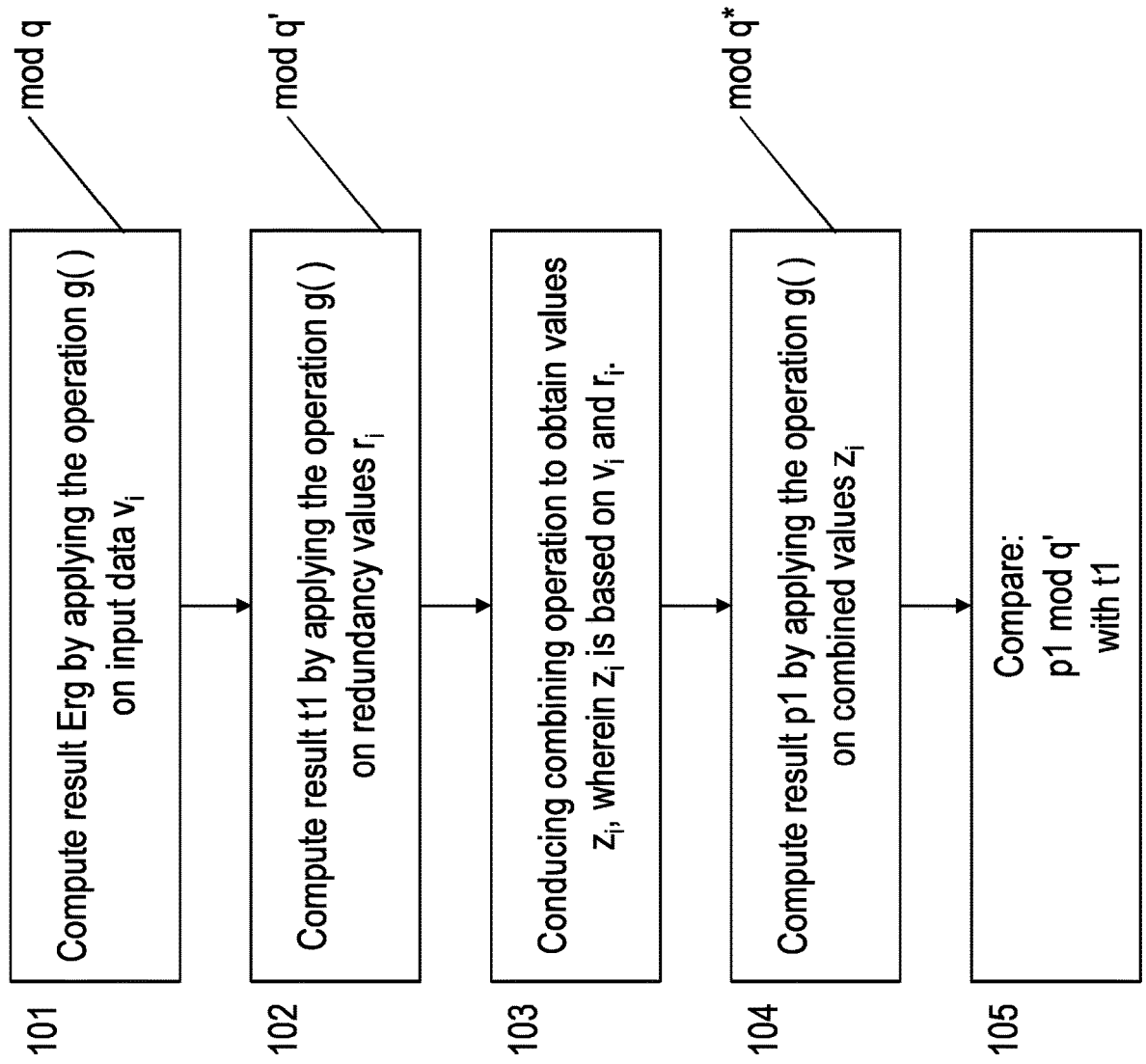
FIG. 1 shows an exemplary flow diagram comprising steps for conducting an operation.

There is a general motivation to move away from classical asymmetric cryptosystems (RSA/ECC) to schemes which cannot be successfully attacked by quantum computers. Even if currently quantum computers are not available due to the technical complexity and engineering challenges, they might be able to break RSA and ECC in polynomial time.

One class of schemes that are supposed to resist attacks by quantum computers are lattice-based public key encryption, key exchange, or signature schemes. They might become the successor of RSA and ECC and either operate on large matrices (standard lattices) or on polynomial rings (ideal lattices). For lattice-based cryptography, reference is made to, e.g., https://en.wikipedia.org/wiki/Lattice-based_cryptography.

However, not much is known with regard to the protection of such lattice-based schemes against implementation attacks. Especially, countermeasures against fault-injection attacks are required when signature or public key encryption schemes are executed on a secure chip card controller or in any adverse environment.

Lattice-based cryptography is a cryptographic system whose security is based on the hardness or related to the hardness of certain mathematically hard problems in lattices. A lattice is a structure that is created by integer linear combinations of basis vectors. Thus a lattice can be described as a regular structure in an n dimensional space. In this n dimensional space certain fundamental problems, like finding a short basis or a short vector are mathematically hard. Usually the hardness of breaking a lattice-based cryptosystem can be reduced or related to the hardness of solving such a fundamental problem.

The following abbreviations and references are used herein:

q is an integer,
q' is an integer,
q* is an integer,
n is an integer,
x is the indeterminate,
f is a polynomial of maximum degree of integer n,
n is an integer indicating a dimension (number of coefficients),
$Z_q$ is the ring of integers modulo q which is the quotient ring $Z/qZ$ of equivalence classes of integers modulo q,
$Z_{q*}$ is a ring of integers modulo q* which is the quotient ring $Z/q*Z$ of equivalence classes of integers modulo q*,
$Z_{q'}$ is a ring of integers modulo q', which is the quotient ring $Z/q'Z$ of equivalence classes of integers modulo q',
$Z[x]/(f)$ is a ring of integer polynomials modulo f; elements $v \in Z[x]/(f)$ can be represented by integer polynomials of a degree less than the integer n or alternatively as a vector of coefficients $v \in Z^n$,
$Z_q[x]/(f)$ is a ring of integer polynomials modulo both the polynomial f and the integer q; the elements $v \in Z_q[x]/(f)$ can be represented by integer polynomials of degree less than n with coefficients reduced modulo q or alternatively as a coefficient vector $v \in Z_q^n$,
$R_q$ is a ring of integer polynomials using integer modulus q, which is an abbreviation for $Z_q[x]/(f)$,
$R_{q*}$ is a ring of integer polynomials using integer modulus q*, which is an abbreviation for $Z_{q*}[x]/(f)$,
$R_{q'}$ is a ring of integer polynomials using integer modulus q', which is an abbreviation for $Z_{q'}[x]/(f)$,
$v_i$ is a coefficient of a vector or polynomial at a position i,
k is an integer,
l is an integer,
$g(\bullet)$ (also denoted as $g(\ )$) is a function, taking inputs in either ring $R_q$, $R_{q*}$, or $R_{q'}$, wherein the modulus of the input polynomials may be used also during the computation (i.e., coefficients are reduced either modulo q, q*, or q'),
$r_i$ are redundancy polynomials in $R_{q'}$, which may be randomly or deterministically generated,
$t_i$ are checksum polynomials in $R_{q*}$, which may in particular be computed by using the redundancy polynomials $r_i$ as input to the function $g(\bullet)$,
$v_i$ are value polynomials in $R_q$, which may be input data to an algorithm and/or embodiment realizing the function $g(\bullet)$,
$z_i$ are lifted polynomials in $R_{q*}$, wherein each coefficient of $z_i$ may contain a combination of the corresponding coefficient of the value polynomial $v_i$ and the redundancy polynomial $r_i$,
$p_i$ are lifted result polynomials in $R_{q*}$, which may be computed by using the lifted polynomials $z_i$ as input to the function $g(\bullet)$,
$w_i$ are result polynomials in $R_q$, wherein an output of the function $g(\bullet)$ applied to the value polynomials $v_i$,
$h(\bullet)$ is a hash function, e.g., SHA-2 or SHA-3,
FFT Fast Fourier Transform,
NTT Number Theoretic Transform,
DPA Differential Power Analysis,
SPA Simple Power Analysis,
ALU Arithmetic Logic Unit.

The quotient ring is a construction in abstract algebra; for details, reference is made to, e.g., https://en.wikipedia.org/wiki/Quotient_ring Examples described herein suggest that security-relevant computations are performed in a redundant representation in combination with coefficient-wise randomization to achieve in particular a protection against side-channel attacks.

All major computations in lattice-based cryptography may be performed modulo q. In some cases, the integer q may be selected to be a certain prime number (e.g., to enable the NTT as NTT only works in an efficient manner in case parameters are selected as certain prime numbers) or the integer q may be chosen as a power-of-two.

Examples presented herein allow detecting fault attacks when executing cryptosystems based on standard or ideal lattice problems under adversarial influence (e.g., on a smart card).

The following examples are described for cryptosystems based on ideal lattices that operate on the quotient ring $$R_q = \frac{Z_q[x]}{\langle x^n + 1 \rangle}.$$

However, the solutions suggested herein also apply to cryptosystems defined over standard lattices, NTRU-like cryptosystems or other cryptosystems defined over $$R_q = \frac{Z_q[x]}{f}$$

for some function $f$.

In general, protection methods are required to prevent tampering with data when crypto operations are performed. In lattice-based cryptography this is mainly polynomial multiplication, addition, subtraction as well as sampling and logical operations (e.g., compare) on polynomials in the quotient ring $R_q$ where q may be a prime integer.

For example, decryption in the LPR10 (see: [Vadim Lyubashevsky, Chris Peikert, Oded Regev: On Ideal Lattices and Learning with Errors over Rings. J. ACM 60(6): 43 (2013)]) lattice-based public encryption scheme requires a computation $$c_1 * s_2 + c_2,$$

where
$c_1, c_2 \in R_q$ are ciphertexts,
$s_2 \in R_q$ is a secret key and
* is a polynomial multiplication in the quotient ring $R_q$.

In the GLP12 (see: [Tim Güneysu, Vadim Lyubashevsky, Thomas Pöppelmann: Lattice-Based Signatures: Optimization and Implementation on Reconfigurable Hardware. IEEE Trans. Computers 64(7): 1954-1967 (2015)]) lattice-based signature scheme a signature $z_1, z_2 \in R_q$ is computed as $$z_1 = y_1 + s_1 * c$$

and $$z_2 = y_2 + s_2$$

where
$s_1, s_2 \in R_q$ are the secret keys,
$c \in R_q$ is a message dependent component from a random oracle, and
$y_1, y_2 \in R_q$ are random (cryptographic) blinding values.

It is known that faults induced during cryptographic operations may lead to severe attacks or that such faults may result in data corruption. Hence, systems need to prevent or detect such faults even if the fault attacks on the data path are not known.

It is suggested to in particular use the so-called Chinese remainder theorem (CRT) composition to add precomputed redundancy into arithmetic computations in lattice-based cryptosystems to be able to detect fault attacks on data and to check that the computation was performed on the correct data.

Examples presented herein refer to fixed checksum data and variable data (e.g., keys, cipher text, noise vectors) as residues and these are combined into one number. The computations are performed on such combined numbers and thus an error in the combined number will most likely also affect the checksum data and thus be detected.

Exemplary Implementation:

Currently there are two flavors of lattice-based cryptography, i.e. ideal lattice-based cryptograph and standard lattice-based cryptography. The approach presented herein is applicable for all sorts of lattice-based cryptography in particular as long as values modulo q computations apply.

The basic operations in ideal lattice-based cryptography are polynomial multiplications, additions, or subtractions in the quotient ring $$Z_q[x]/(f),$$

where the modulus q is an integer and the dimension (number of coefficients) is an integer n.

A reduction of the polynomial might be achieved by reducing "modulo the polynomial f". An exemplary value for f is $$f = x^n + 1 \text{ or } f = x^n - 1,$$

but other polynomials may be used accordingly.

Operations in standard lattice-based cryptography comprise matrix-matrix multiplications, matrix-vector multiplications, or vector additions and subtractions where coefficients are values in the ring of integers modulo q.

The solution suggested herein in particular works with lattice-based cryptography, wherein each coefficient of an element is reduced modulus q (an element can be in the ring $Z_q[x]/(f)$, be a matrix, a vector or a matrix of rings).

In this case a modulus q' is chosen and a new modulus $$q^* = q \cdot q'$$

is computed (in general, also several moduli q' may be used). The modulus and the modulus q may be relative prime, i.e. not have any integer divisors greater than one.

The choice of the modulus q' may determine the ability of the system to detect faults and/or errors and the choice of may be made so that q* allows for a more efficient arithmetic.

A basic objective when executing operations in a lattice-based cryptosystem is to perform a certain number of operations on given values $v_1, \ldots, v_k \in R_q$. In this example, the values $v_i$ are elements of the ring $R_q$ and k is an integer. However, the example may also work with the values $v_i$ being matrices or vectors. One particular feature of the values $v_i$ is that the coefficients are reduced modulo q.

This means the computation of a function g (•) that returns at least one result such that $$g(v_1, \ldots, v_k) \rightarrow (w_1, \ldots, w_l),$$

wherein k is the number of inputs and l is the number of outputs.

The function g(•) may be any arithmetic operations defined on the ring $R_q$, e.g., a polynomial addition, a polynomial subtraction, a polynomial multiplication, a finding of an inverse or a multiplication of a polynomial by a scalar. Additionally, the function g(•) may comprise reordering operations of individual coefficients of a polynomials in $R_q$ or pointwise multiplication of elements in $R_q$.

An example is the LPR10 decryption function $$g_{LPR}(c_1, c_2, s_2) = c_1 * s_2 + c_2.$$

The following steps may be performed to conduct the protected computation as suggested herein:

(1) A redundancy polynomial $r_i \in R_{q'}$ is chosen according to a predetermined scheme or it is chosen arbitrarily. Each $r_i$ is associated with a value $v_i$, wherein $v_i$ is the given value for the operation g( ) to be conducted. For example, $v_i$ can be a user input like a ciphertext, a constant system parameter, or a key, in particular a secret key.

(2) The operation g( ) is performed for the values $r_i$, i.e.

$$g(r_1, \ldots, r_k) = t_1, \ldots, t_l$$

is computed with $t_1, \ldots, t_l$ being checksums (i.e. redundancy information) that may be stored in the device, either uncompressed or compressed. This compression can be performed by a hash function like SHA256 or some other type of checksum generator.

These steps (1) and (2) may advantageously be performed offline, i.e. before the system is deployed or before timing-critical computations are executed.

The following steps are carried out when a fault-protected computation has to be performed:

(3) Each value $v_i \in R_q$ and each associated value $r_i \in R_{q'}$ is lifted into $$z_i \in R_{q^*}$$

by performing for each coefficient j of each value $v_i$ and $r_i$ a combining operation (which can also be regarded as a lifting operation, because the values $z_i$ are lifted into the mod q* domain) as follow:

$$z_i[j] = (v_i[j]q'(q'^{-1} \bmod q) + r_i[j]q(q^{-1} \bmod q')) \bmod q^*.$$

(4) Then the function $$g(z_1, \ldots, z_k) \rightarrow (p_1, \ldots, p_l)$$

is computed on the lifted polynomials $z_1, \ldots, z_k \in R_{q^*}$ providing the results $p_1, \ldots, p_l \in R_{q^*}$.

(5) Next, it is checked whether the results $r_i$ are correct. This can be done by checking whether each $$p_i \bmod q' == t_i$$

to test that the checksum $t_i$ has been calculated correctly (again, this check can also be performed on hashed and/or compressed values of $p_i \bmod q'$ or $t_i$).

If this comparison leads to a mismatch, a fault has occurred and the system may, e.g., enter an alarm state and/or handle the fault appropriately (e.g., by shutting down the system or a portion of the system).

The final result is $p_i \bmod q$, which is equal to $w_i$ and thus as if the function g( ) would have been applied directly on the input values $v_i$.

Further Aspects:

The function g( ) may utilize any data structure, wherein said data structure may be a matrix, a vector or an element in $R_q$. The function g( ) may hence be an operation combining several data structures of a compatible type. Each data structure may in particular comprise at least one coefficient such that the function g( ) can be executed based on this at least one coefficient per data structure.

This is in particular advantageous, because the above-mentioned steps (1) to (5) are conducted on the coefficients of the data structure, e.g., elements in $R_q$.

As an example, a combining operation on a matrix $V_i \in Z_q^{m \times n}$ instead of a polynomial $v_i$ and on a matrix $R_i \in Z_{q'}^{m \times n}$ instead of a polynomial $r_i$ is $$Z_i[j][l] = (V_i[j][l]q'(q'^{-1} \bmod q) + R_i[j][l]q(q^{-1} \bmod q')) \bmod q^*$$

for an integer $j \in \{0, \ldots, m-1\}$ and an integer $l \in \{0, \ldots, n-1\}$, wherein the integer j denotes the column and the integer l denotes the row of the matrix (or vice versa). The result is a matrix $Z_i \in Z_{q^*}^{m \times n}$.

For efficiency reasons, all values of $r_i$ may be the same values or they may at least partially be zero. However, for all-zero values of $r_i$ the checksum that is finally computed may also be all-zero, which might be desirable for efficiency reasons. However, by choosing the coefficients $r_i$ with some structure (i.e. at least a couple of values of $r_i$ being different from zero), the computed checksum based on these values $r_i$ may be more favorable to detect when operations have been skipped or when wrong data was used for an operation. This allows checking for attacks on the control flow (e.g., skipping of operations or usage of wrong elements, like usage of a different key).

It is noted that the values $r_i$ can be stored in the memory of the device or they may be sampled on the fly, e.g., from a hash function or LFSR (linear feedback shift register) that is seeded (i.e. fed with predetermined values) appropriately, or be constructed according to some predefined rule.

An option is also to sample random values $r_1', \ldots, r_k'$ and to compute new checksums $g(r_1', \ldots, r_k') = t_1', \ldots t_l'$ when the device is idle, i.e. in particular not performing any operations. A new checksum may also be computed based on newly sampled values $r_i$ after a predetermined number of operations.

It is noted that "random" in this regard (e.g., selecting randomly or any random value) may be a true random, a pseudo-random or a deterministic approach to obtain a value. Hence, the property of such "randomness" or any random effect according to the proposal provided herewith may be that an attacker is unaware of the value and that values are different for at least a portion of operations. The randomness in particular adds a certain level of entropy between values that are "randomly" determined, e.g., generated or selected.

The values $r_1', \ldots, r_k'$ are not known to an adversary. Using these values hence scramble and/or randomize the data and make certain side-channel attacks more difficult thereby reducing the chances of an adversary's attack.

This approach is advantageous, especially on software platforms when standard parameters are used for which it holds that $\log(q=12289) \approx 14$-bit. In this case, half of a typical 32-bit processor's registers is not used and can thus be employed to add redundancy. Hence, q' can be chosen in a way such that $\log_2(q^*) \sim 32$ thereby using the full word length of the processor.

It is also an advantage that the solution presented does not require any basic modification of the underlying algorithms, except for using a larger modulus q* during the security critical evaluation of $(z, \ldots, z_k)$. The fault check itself is easy to perform (coefficient by coefficient) and the transformation into $R_{q^*}$ can be made even more efficient by using precomputations, e.g., of $q'(q'^{-1} \bmod q)$,
$q(q^{-1} \bmod q')$ and/or
$r_i[j]q(q^{-1} \bmod q')$.

The final check comprises the "mod q'"-operation and a comparison. Storage space can be minimized by on-the-fly generation of $r_i$ values and checked against a compressed checksum using an appropriate hash function h (e.g., check $h(p_i \bmod q') == h(t_i)$, or even a combination of all redundant values and checksums (e.g., $h(p_1 \bmod q', \ldots, p_l \bmod q') == h(t_1, \ldots, t_l)$ so that only $h(t_1, \ldots, t_l)$ has to be stored). A possible instantiation of h is SHA-2 or SHA-3.

The approach is applicable for software as well as for protecting hardware implementations. The redundancy information is not data dependent, which allows pre-computation and other optimization.

Exemplary Implementation:

An implementation may be given for the decryption procedure in the LPR10 lattice-based encryption scheme. The parameters are q=12289, n=8, q'=3, q*=36867 and the operation to be performed is $$e = *s_2 + c_2.$$

An objective is to recognize any fault inducting during the computation of the result e. In this example the redundancy value $r_1$ associated with $v_1 = c_1$ is [1,1,0,0,1,1,0,0], the redundancy value $r_2$ associated with $v_2 = c_2$ is [1,0,1,0,1,0,1,0] and the redundancy value $r_3$ associated with $v_3 = s_2$ is [2,1,2,1,2,1,2,1]. As the redundancy values $r_1$, $r_2$, $r_3$ may each be generated based on a pattern (e.g., $r_1$ is based on repeating a pattern "1,1,0,0", $r_2$ is based on repeating a pattern "1,0" and $r_3$ is based on repeating a pattern "2,1"), they can be generated on-the-fly.

Hereinafter, the algorithm in the programming language Python is exemplarily used:

```
# Helper functions
def mul(a,b,modulus):
    res = [0]*(n)
    for o1,i1 in enumerate(a):
        for o2,i2 in enumerate(b):
            res[(o1+o2) % n] = (res[(o1+o2) % n] + i1*i2) % modulus
    return res
def add(res,a, modulus):
    for i in range(len(res)):
        res[i] = int((res[i] + a[i]) % modulus)
def to_composite(s1,s1_check, mod_check, mod_check_prime, mod_data, mod_data_inverse):
    res = [0]*(n)
    for i in range(len(res)):
        res[i] = (s1[i]*mod_check*mod_check_inverse + s1_check[i]*mod_data*mod_data_inverse) % (mod_data*mod_check)
    return res
def to_mod(s1, modulus):
    res = [0]*(n)
    for i in range(len(res)):
        res[i] = s1[i] % modulus
    return res
# Main program
n = 8
mod_data = 12289
mod_check = 3
mod_crt = mod_data*mod_check
mod_data_inverse = 1
mod_check_inverse = 8193
mod_crt = mod_data*mod_check
print "q =", mod_data
print "q' =", mod_check
print "q* =", mod_crt
print "(q'^(-1) mod q) = ", mod_check_inverse , "(mod_check * mod_check_inverse = 1 mod q)"
print "(q^(-1) mod q') = ", mod_data_inverse , "(mod_data * mod_data_inverse = 1 mod q')"
print "n = ", n
print "f = x^n-1"
c1 = [32, 4332, 41, 232 ,4343, 5343, 3131, 222]
c2 = [323, 121, 534, 532 ,4343, 132, 332, 32]
s2 = [0, 1, 2, 3, 1, 4, 1, 3]
c1_r = [1,1,0,0,1,1,0,0]
c2_r = [1,0,1,0,1,0,1,0]
s2_r = [2,1,2,1,2,1,2,1]
print "v1 (corresponds to c1) =", c1
print "v2 (corresponds to c2) =", c2
print "v3 (corresponds to s2) =", s2
print "r1 (corresponds to c1/v1) =", c1_r
print "r2 (corresponds to c2/v2) =", c2_r
print "r3 (corresponds to s2/v3) =", s2_r
print "e = v1*v3+v2"
e = mul(c1, s2, mod_data)
add(e, c2, mod_data)
print "Result (normal):"
print e
e = mul(c1_r, s2_r, mod_check)
add(e, c2_r, mod_check)
print "Result (using redundancy):"
print "t1 = g(r1,r2,r3) =", e
c1_c = to_composite(c1,c1_r, mod_check, mod_check_inverse, mod_data, mod_data_inverse)
c2_c = to_composite(c2,c2_r, mod_check, mod_check_inverse, mod_data, mod_data_inverse)
s2_c = to_composite(s2,s2_r, mod_check, mod_check_inverse, mod_data, mod_data_inverse)
print "z1 = lift(v1,r1) = ", c1_c
print "z2 = lift(v2,r2) = ", c2_c
print "z3 = lift(v3,r3) = ", s2_c
e = mul(c1_c, s2_c, mod_crt)
add(e, c2_c, mod_crt)
print "Result (mod q*):"
print "g(z1,z2,z3) -> p1 =", e
print "Result (data part; p1 mod q):"
print "p1 mod q =", to_mod(e, mod_data)
print "Result (redundancy part; p1 mod q'):"
print "p1 mod q' =", to_mod(e, mod_check)
print "Result matches t1\n"
print "Result where a fault is induced (flip lsb of first coefficient of e; p1 mod q'):"
e[0] = e[0] ^ 1;
print "p1 mod q' =", to_mod(e, mod_check)
print "Result does not match t1"
```

This code produces the following output:

```
q = 12289
q' = 3
q* = 36867
(q'^(-1) mod q) = 8193 (mod_check * mod_check_inverse = 1 mod q)
(q^(-1) mod q') = 1 (mod_data * mod_data_inverse = 1 mod q')
n = 8
f = x^n-1
v1 (corresponds to c1) = [32, 4332, 41, 232, 4343, 5343, 3131, 222]
v2 (corresponds to c2) = [323, 121, 534, 532, 4343, 132, 332, 32]
v3 (corresponds to s2) = [0, 1, 2, 3, 1, 4, 1, 3]
r1 (corresponds to c1/v1) = [1, 1, 0, 0, 1, 1, 0, 0]
r2 (corresponds to c2/v2) = [1, 0, 1, 0, 1, 0, 1, 0]
r3 (corresponds to s2/v3) = [2, 1, 2, 1, 2, 1, 2, 1]
e = v1*v3+v2
Result (normal):
[4277, 8482, 10560, 3584, 866, 6848, 8546, 7124]
Result (using redundancy):
t1 = g(r1,r2,r3) = [1, 0, 1, 0, 1, 0, 1, 0]
z1 = lift(v1,r1) = [24610, 16621, 12330, 24810, 28921, 17632, 15420, 222]
z2 = lift(v2,r2) = [24901, 24699, 12823, 25110, 28921, 132, 24910, 12321]
z3 = lift(v3,r3) = [24578, 1, 2, 12292, 12290, 4, 12290, 12292]
Result (mod q*):
g(z1,z2,z3) -> p1 = [28855, 33060, 22849, 15873, 25444, 19137, 33124, 19413]
Result (data part; p1 mod q):
p1 mod q = [4277, 8482, 10560, 3584, 866, 6848, 8546, 7124]
Result (redundancy part; p1 mod q'):
p1 mod q' = [1, 0, 1, 0, 1, 0, 1, 0]
Result matches t1
Result where a fault is induced (flip lsb of first coefficient of e; p1 mod q'):
p1 mod q' = [0, 0, 1, 0, 1, 0, 1, 0]
Result does not match t1
```

The examples described herein can be realized as instructions processed by a data processing device like a personal computer, microcontroller, or smart card.

FIG. 1 shows an exemplary flow diagram comprising steps for conducting an operation g( ):

In a step 101, a result Erg (mod q) is calculated based on input data $v_1$, $v_2$ and $v_3$ as follows:

$$Erg = g(v_1, v_2, v_3) = v_1 * v_3 + v_2.$$

Also, the result Erg is stored.

In a step 102, a result t1 (mod q') is calculated based on the redundancy values $r_1$, $r_2$, $r_3$, wherein the redundancy value $r_1$ is associated with the input data $v_1$, the redundancy value $r_2$ is associated with the input data $v_2$ and the redundancy value $r_3$ is associated with the input data $v_3$:

$$t_1 = g(r_1, r_2, r_3) = r_1 * r_3 + r_2.$$

The result $t_1$ is stored.

In a step 103, the combining operation is conducted based on $$z_i[j] = (v_i[j] q'(q'^{-1} \bmod q) + r_i[j] q(q^{-1} \bmod q')) \bmod q^*,$$

wherein three values $z_i$ are determined for i=1, 2 and 3. The value $z_1$ is determined based on the input data $v_1$ and the redundancy value $r_1$, the value $z_2$ is determined based on the input data $v_2$ and the redundancy value $r_2$ and the value $z_3$ is determined based on the input data $v_3$ and the redundancy value $r_3$.

In a step 104, a result p1 (mod q*) is calculated based on the values $z_1$, $z_2$ and $z_3$ as follows:

$$p1 = g(z_1, z_2, z_3) = z_1 * z_3 + z_2.$$

It is noted that $q^* = q \cdot q'$

In a step 105, it is checked whether the result of the operation $$p_1 \bmod q'$$

is the same as $t_1$. If this is the case, no fault or attack has been detected. If it is different from $t_1$, then an attack or a fault is determined and a predefined action may be triggered, e.g., issuing an alarm notification and/or stopping the operation and/or the system.

It is also an option to conduct the operation $$p_i \bmod q$$

to determine the result Erg and/or whether the result Erg is the same as the outcome of this operation.

It can be seen that a bit flip of the least significant bit of the first coefficient of $p_1 \in R_{q^*}$ leads to a different redundancy result [1, 0, 1, 0, 1, 0, 1, 0] in comparison to [0, 0, 1, 0, 1, 0, 1, 0]. This way a fault attack flipping single bits can be detected. For better fault coverage, a larger q' could be used.

It is noted that the approach described herein may be used together with a masking scheme. A masking scheme may use a fresh random value added to a security critical value during each iteration to obscure the actual used value. The computation is then carried out on the fresh random value itself and on the values to which the random value was applied. Finally the results are combined together to obtain the result.

For efficiency reasons, redundancy and data can already be stored in the domain $R_{q^*}$.

Additionally, a sampler generating noise polynomials may have sampled in the target distribution q* or directly apply the redundancy information.

The solutions suggested may in particular involve at least one of the following components or functions realized in hardware, software, or a combination thereof:

A redundancy value generation unit. This may be realized as either a look-up table, an LFSR, a stream cipher, a generator that uses simple rules (as in the example above) or any other component that generates an output stream.

An encoding unit. This unit computes $z_i \in R_{q^*}$ based on $r_i$ and $c_i$.

A unit that computes at least one function g( ) in $R_{q^*}$ where operations are performed mod q*.

A decoding unit. This unit extract redundancy and data information from an element in $R_{q^*}$.

A comparison unit. This unit stores precomputed values $t_1, \ldots, t_l$ where $g(r_1, \ldots, r_k) \rightarrow (t_1, \ldots, t_l)$ and compares these values with the computed redundancy.

Figure 2:
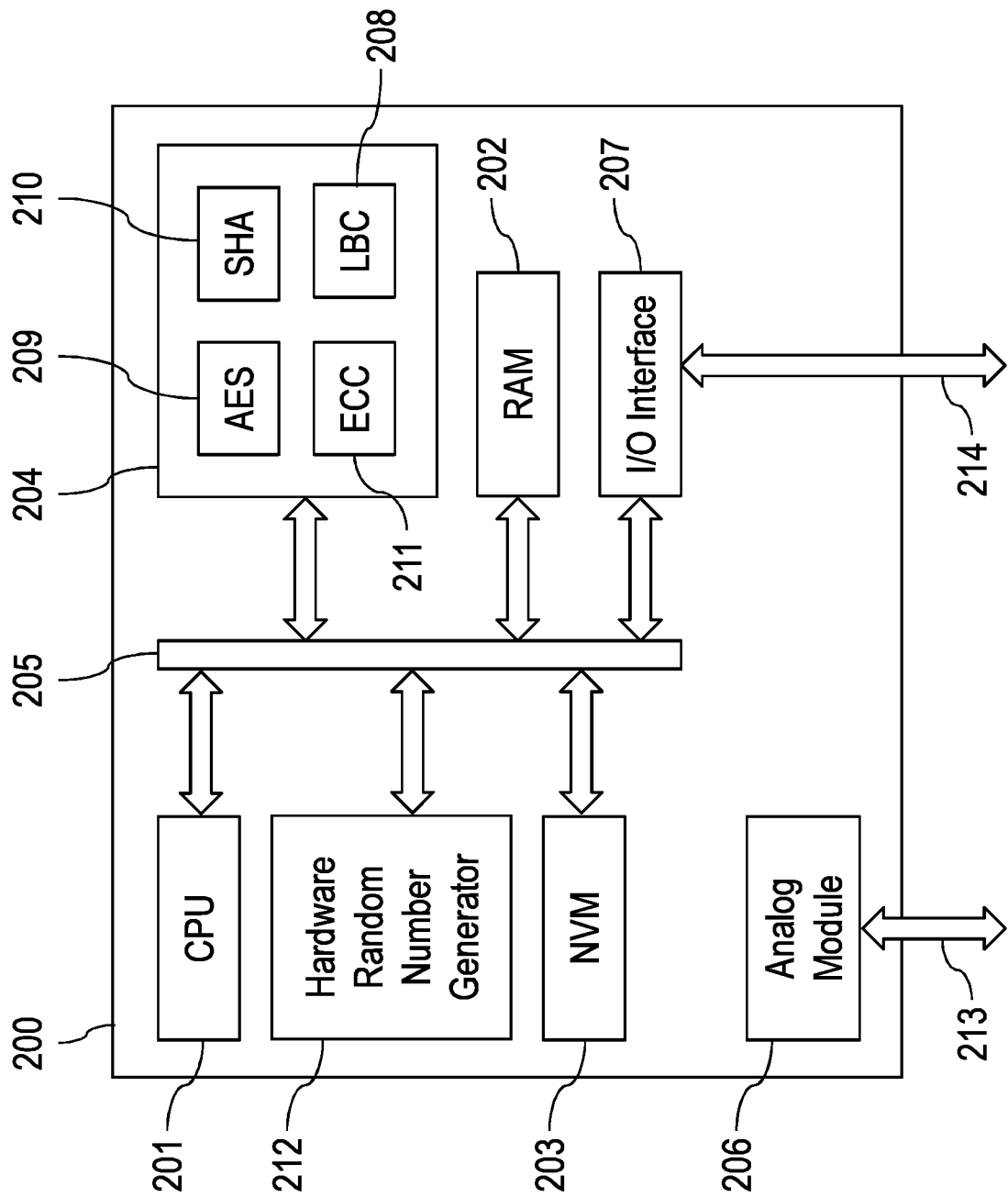
FIG. 2 shows an exemplary arrangement of a processing device comprising a CPU, a RAM, a non-volatile memory, a crypto module, an analog module, an input/output interface and a hardware-random number generator.

FIG. 2 shows a processing device 200 comprising a CPU 201, a RAM 202, a non-volatile memory 203 (NVM), a crypto module 204, an analog module 206, an input/output interface 207 and a hardware-random number generator 212.

In this example, the CPU 201 has access to at least one crypto module 204 over a shared bus 205 to which each crypto module 204 is coupled. Each crypto module 204 may in particular comprise one or more crypto cores to perform certain cryptographic operations. Exemplary crypto cores are:

an AES core 209,
a SHA core 210,
an ECC core 211, and
a lattice-based crypto (LBC) core 208.

The lattice-based crypto core 208 may be provided in order to accelerate lattice-based cryptography.

The CPU 201, the hardware random number generator 212, the NVM 203, the crypto module 204, the RAM 202 and the input/output interface 207 are connected to the bus 205. The input output interface 207 may have a connection 214 to other devices, which may be similar to the processing device 200.

The crypto module 204 may or may not be equipped with hardware-based security features.

The analog module 206 is supplied with electrical power 213 via an electrical contact and/or via an electromagnetic field. This power is supplied to drive the circuitry of the processing device 200 and may in particular allow the input/output interface to initiate and/or maintain connections to other devices via the connection 214.

The bus 205 itself may be masked or plain. Instructions to process the steps described herein may in particular be stored in the NVM 203 and processed by the CPU 205. The data processed may be stored in the NVM 203 or in the RAM 202. Supporting functions may be provided by the crypto modules 204 (e.g., expansion of pseudo random data). Random numbers are supplied by the hardware-random number generator 212.

Steps of the method described herein may exclusively or at least partially be conducted on the crypto module 204, e.g., on the lattice-based crypto core 208. For example, instructions may be stored in the lattice-based crypto core 208 or they may be provided by the CPU 201 via the bus 205. Data may be stored locally with the lattice-based crypto core 208. It is also an option that the data is temporarily stored in the RAM 202 or the NVM 203. The lattice-based crypto core 208 may also use other crypto modules to provide supporting functions (e.g., expansion of pseudo random data). The lattice-based crypto core 208 may also comprise a hardware-random number generator 212 or a means to generate physical and/or software random numbers.

The processing device 200 may be a chip card powered by direct electrical contact or through an electro-magnetic field. The processing device 200 may be a fixed circuit or based on reconfigurable hardware (e.g., Field Programmable Gate Array, FPGA). The processing device 200 may be coupled to a personal computer, microcontroller, FPGA or a smart phone.

The solution described herein may be used by a customer that intends to provide a secure implementation of lattice-based cryptography on a smart card or any secure element.

The examples suggested herein may in particular be based on at least one of the following solutions. In particular combinations of the following features could be utilized in order to reach a desired result. The features of the method could be combined with any feature(s) of the device, apparatus or system or vice versa.

A method is suggested for checking results comprising:
(a) determining a first result by conducting an operation g( ) based on test data;
(b) determining combined data by performing a combining operation based on the test data and the user data;
(c) determining a second result conducting the operation g( ) based on the combined data;
(d) determining whether the second result is indicative of the first result.

The operation g( ) may in particular be subject to secrecy. It may in particular be a cryptographic operation or an operation that is part of a cryptographic operation.

It is noted that the operation g( ) may be any operation that is based on polynomials, vectors and/or matrices.

The operation g( ) may comprise any sequence of arithmetic operations or any reordering of coefficients in the data structures used in the operation g( ).

The arithmetic operation may comprise at least one of the following: addition, subtraction, multiplication by a scalar, polynomial multiplication, FFT transformation, pointwise multiplication.

The reordering may comprise at least one of the following: changing the sequence of coefficients of the data structures, bit reversal, permutation.

The test data are also referred to as redundancy data or checksum data.

User data may be any kind of processing data, in particular: a user input, a ciphertext, a constant system parameter, a key, in particular a secret key. Basically, user data may be any data that is subject to processing.

The operation g( ) is an exemplary function that is to be executed. By "lifting" parameters to a higher order modulo in step (b) by adding redundancy, the operation g( ) is conducted in step (c) on higher numbers which give the impression of a higher degree of entropy to an outside attacker. Hence due to this additional redundancy, the operation g( ) is processed on larger numbers, which make it more difficult so, e.g., a side-channel attacker, to measure and systematically observer patterns that allow determining the user data (which may be or comprise (secret) keys).

On the other hand, the approach is very efficient, because the second result can be easily checked and reduced to the value of the original computation.

With regard to the example shown in FIG. 1, the first result corresponds to the result t1 obtained in step 102, the combining operation is conducted in step 103 and the second result corresponds to the result p1 obtained in step 104.

It is an option to store the respective results (all of them or a selection thereof) with the device conducting the operation and/or with a separate (e.g., secure) device.

It is noted that the test data and the user data may each be coefficients of a data structure from a representation modulo an integer. The data structure may in particular be a polynomial f in the ring $Z_q [x]/(f)$. The polynomial f may be exemplarily defined as $f=x^n+1$ or as $f=x^n-1$.

In an embodiment,
the first result is determined by conducting the operation g( ) modulo an integer q',
the second result is determined by conducting the operation g( ) modulo an integer q*,
the integer q* is larger than the integer q',
step (d) further comprises:
determining whether the second result is indicative of the first result by comparing the second result modulo q' with the first result.

In an embodiment, a predetermined first action is triggered in case the second result modulo q' is different from the first result.

In this case, the comparison indicates a fault or an attack (e.g., a side-channel attack). The first action may be issuing a notification, e.g., an alarm notification, and/or entering a safe state of a device or system.

In an embodiment, a predetermined second action is triggered in case the second result modulo q' is not different from the first result.

In this case, the comparison indicates that no fault or attack has been determined. The operation has hence been successfully verified. The device or system may proceed accordingly.

In an embodiment, the method further comprises:
prior to step (a): determining a third result by conducting the operation g( ) modulo q based on the user data; and
after step (c): determining the second result modulo q, wherein q*=q·q'.

The second result modulo q should equal the third result. In other words, the result of the operation g( ) being applied on the user data can be obtained by determining the second result modulo q.

In an embodiment, prior to step (a) the test data are generated randomly, pseudo-randomly or according to a deterministic algorithm.

In an embodiment, the test data are generated at a predetermined time and/or trigger.

For example, new test data may be generated after a predetermined number of operations or after a predetermined time. Also, the new test data may be used to compute new first results, in particular during an idle state of a processor or system, e.g., when no other operations need to be performed.

In an embodiment, the combining operation determines one combined value based on a pair of one value of the test data and one value of the user data.

Hence, a value of the user data is associated with one value of the test data. This pair of data is combined in the combining operation to obtain a "lifted" combined value. Lifted in this regard refers to a data structure that is transformed ("lifted") from a representation modulo q to a representation modulo q*, wherein q*>q.

In an embodiment, the operation g( ) is an arithmetic operation.

In an embodiment, the operation g( ) is a cryptographic operation.

In an embodiment, the operation g( ) is a lattice-based operation, which is based on operations modulo an integer.

Lattice-based cryptography is a cryptographic system whose security is based on the hardness of certain mathematically hard problems in lattices. A lattice is a structure that is created by integer linear combinations of basis vectors. Thus a lattice can be described as a regular structure in an n dimensional space. In this n dimensional space certain fundamental problems, like finding a short basis or a short vector are mathematically hard. Usually the hardness of breaking a lattice-based cryptosystem can be reduced or related to the hardness of solving such a fundamental problem.

In an embodiment, the combining of the test data and the user data comprises:

$$z_i[j]=(v_i[j]q'(q'^{-1} \bmod q)+r_j[j]q(q^{-1} \bmod q')) \bmod q*.$$

wherein
$v_i$ is a value of the user data,
$r_i$ is a value of the test data,
$z_i$ is a value of the combined operation,
q is an integer,
q' is an integer,
q* is an integer,
wherein q*=q·q'.

In an embodiment, the integers q and do not have an integer divisor that is greater than one.

In an embodiment, the method is used for operating a processing device, in particular one of the following:
a FPGA,
a processing unit,
a controller,
a smartcard.

Also, a device is provided, said device comprising
a processing unit,
a crypto unit,
a bus that couples the processing unit with the crypto unit,
wherein the crypto unit is arranged to
  (a) determining a first result by conducting an operation g( ) based on test data;
  (b) determining combined data by performing a combining operation based on the test data and the user data;
wherein the processing unit is arranged to
  (c) determining a second result conducting the operation g( ) based on the combined data;
and wherein the crypto unit is arranged to
  (d) determining whether the second result is indicative of the first result.

It is noted that the device may be a security device, which may in particular be or comprise an integrated circuit (IC), a hardware security module (HSM), a trusted platform module (TPM).

The crypto unit may be or comprise one of the following: a crypto processor, a crypto-portion of a security controller or a security-controller. The crypto unit may also comprise or be a crypto core or a crypto module.

The device may be a security controller or a dongle.

The device may in particular comprise hardware and software portions. It may in particular comprise a hardware root of trust.

It is further noted that the crypto unit may be or comprise a HSM or a TPM. It is also an option that the TPM comprises a CPU, a crypto module and crypto core.

In an embodiment, the device is a FPGA, a processing unit, a controller, a smartcard integrated circuit (smartcard IC) or a smartcard.

Also, a computer program product is suggested that is directly loadable into a memory of a digital processing device, comprising software code portions for performing the steps of the method as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for checking results by a device having a crypto unit or a processor, comprising:
   (a) determining, by the crypto unit or the processor, a first result by conducting an operation g( ) based on test data;
   (b) determining, by the crypto unit or the processor, combined data by performing a combining operation based on the test data and user data;
   (c) determining, by the crypto unit or the processor, a second result by conducting the operation g( ) based on the combined data; and
   (d) determining, by the crypto unit or the processor, whether the second result is indicative of the first result to detect whether a fault occurred.

2. The method according to claim 1, wherein:
   the first result is determined by conducting the operation g( ) modulo an integer q',
   the second result is determined by conducting the operation g( ) modulo an integer q*, and the integer q* is larger than the integer q', and
   the step (d) further comprises determining whether the second result is indicative of the first result by comparing the second result modulo q' with the first result.

3. The method according to claim 2, wherein a predetermined first action is triggered in case the second result modulo q' is different from the first result.

4. The method according to claim 2, wherein a predetermined second action is triggered in case the second result modulo q' is not different from the first result.

5. The method according to claim 2, further comprising:
   prior to the step (a), determining a third result by conducting the operation g( ) modulo q based on the user data; and
   after the step (c), determining the second result modulo q, wherein q*=q·q'.

6. The method according to claim 1, wherein prior to the step (a), the test data are generated randomly, pseudo-randomly, or according to a deterministic algorithm.

7. The method according to claim 6, wherein the test data are generated at a predetermined time or trigger.

8. The method according to claim 1, wherein the combining operation determines one combined value based on a pair of one value of the test data and one value of the user data.

9. The method according to claim 1, wherein the operation g( ) is an arithmetic operation.

10. The method according to claim 1, wherein the operation g( ) is a cryptographic operation.

11. The method according to claim 1, wherein the operation g( ) is a lattice-based operation, which is based on operations modulo an integer.

12. The method according to claim 1, wherein the combining of the test data and the user data comprises:

$$z_i[j]=(v_i[j]q'(q'^{-1} \bmod q)+r_i[j]q(q^{-1} \bmod q')) \bmod q^*,$$
and wherein $v_i$ is a value of the user data, $r_i$ is a value of the test data, $z_i$ is a value of the combined operation, q is an integer, q' is an integer, q* is an integer, and q*=q·q'.

13. The method according claim 12, wherein the integers q and q' do not have an integer divisor that is greater than one.

14. The method according to claim 1, wherein the method is used for operating a FPGA, a processor, a controller, or a smartcard.

15. A device, comprising:
    a processor and/or
    a crypto unit coupled together,
    wherein the processor and/or the crypto unit is arranged to:
    (a) determine a first result by conducting an operation g( ) based on test data; and
    (b) determine combined data by performing a combining operation based on the test data and user data;
    (c) determine a second result conducting the operation g( ) based on the combined data; and
    (d) determine whether the second result is indicative of the first result to detect whether a fault occurred.

16. The device according to claim 15, wherein the device is a FPGA, a processor, a controller, or a smartcard.

17. A non-transitory computer program product directly loadable into a memory of a digital processor, comprising software code for performing the steps of the method according to claim 1.

* * * * *